Jan. 3, 1950

A. J. VASSELLI 2,493,560

LEAD WIRE STRAIGHTENING MACHINE

Filed Aug. 23, 1945

INVENTOR
ANTHONY J. VASSELLI
BY Charles McClair
ATTORNEY

Patented Jan. 3, 1950

2,493,560

UNITED STATES PATENT OFFICE 2,493,560

LEAD WIRE STRAIGHTENING MACHINE

Anthony J. Vasselli, Newark, N. J., assignor to Radio Corporation of America, a corporation of Delaware Application August 23, 1945, Serial No. 612,163

11 Claims. (Cl. 140—147)

My invention relates to apparatus for straightening and preparing the outer leads or wires of the envelope of radio tubes and the like to facilitate the threading or guiding of the leads into hollow contact pins on the base of the envelope.

The final operation in the manufacture of many electrical devices, such as radio tubes, having on the stem a number of outer leads or wires connected to tubular contact pins on a base, comprises threading the wires into and through the tubular contact pins and joining the outer ends of the pins and wires, usually by soldering. The outer leads are usually slender wires two or three inches long, and many types of tubes have seven to nine or more outer leads. Tubes of the tipless type have the exhaust tube in the middle of the group or bunch of outer leads which are usually arranged on the stem in a circle concentric with the exhaust tube. Where the tubes are exhausted on the conventional exhaust and sealing machines the tube usually arrives at the base-threading stage with the outer leads twisted together and often snarled, and the individual leads often crooked, kinked, and bent, because the outer leads are twisted together and then bent to one side to be out of the way of the sealing-off fires which play on the exhaust tube close to the stem to seal off the tube from the pumps. Before threading the leads into the base can begin, the leads must be straightened and preferably cut to the proper length. In threading the base by hand, the leads are straightened individually and one at a time, the ends of the leads then positioned to correspond approximately to the spacing of the contact pins, and the leads then guided by hand into the pins. Various types of mechanical fingers and combs for stroking the leads lengthwise to untangle and straighten them have been tried without commercial success. Combing the twisted and snarled leads will separate them, but will not take the crooks and bends out of the individual leads even when the leads are soft copper wires.

An object of my invention is to provide a means for separating and also straightening the outer lead wires to prepare them for quick and easy insertion into the contact pins on the base of the envelope of radio tubes and the like.

Another object of my invention is to provide apparatus which will automatically separate and straighten outer lead wires sealed into a stem without injury to the seals and trim the leads to the correct length.

This application is a continuation-in-part of my application Serial No. 448,742, filed June 27, 1942, for a Lead wire threading machine, issued December 4, 1945, as Patent No. 2,390,139 and assigned to the same assignee.

Figure 1:
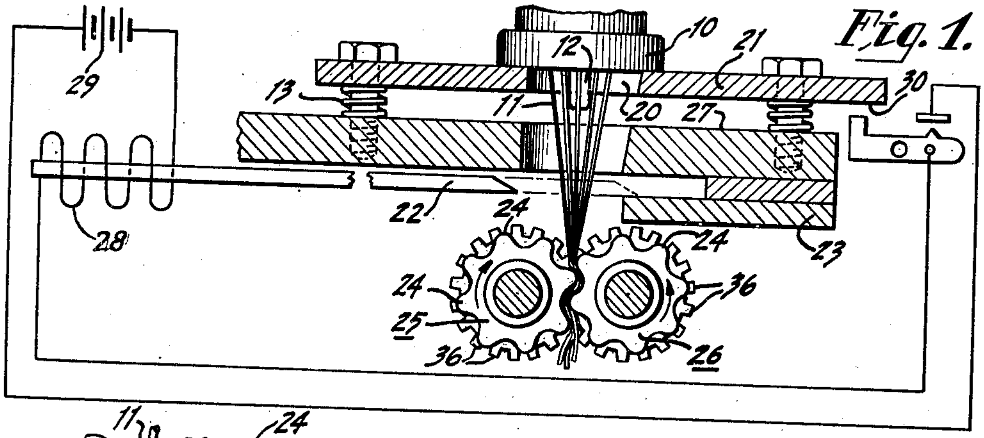
Figures 2, 3, 4:
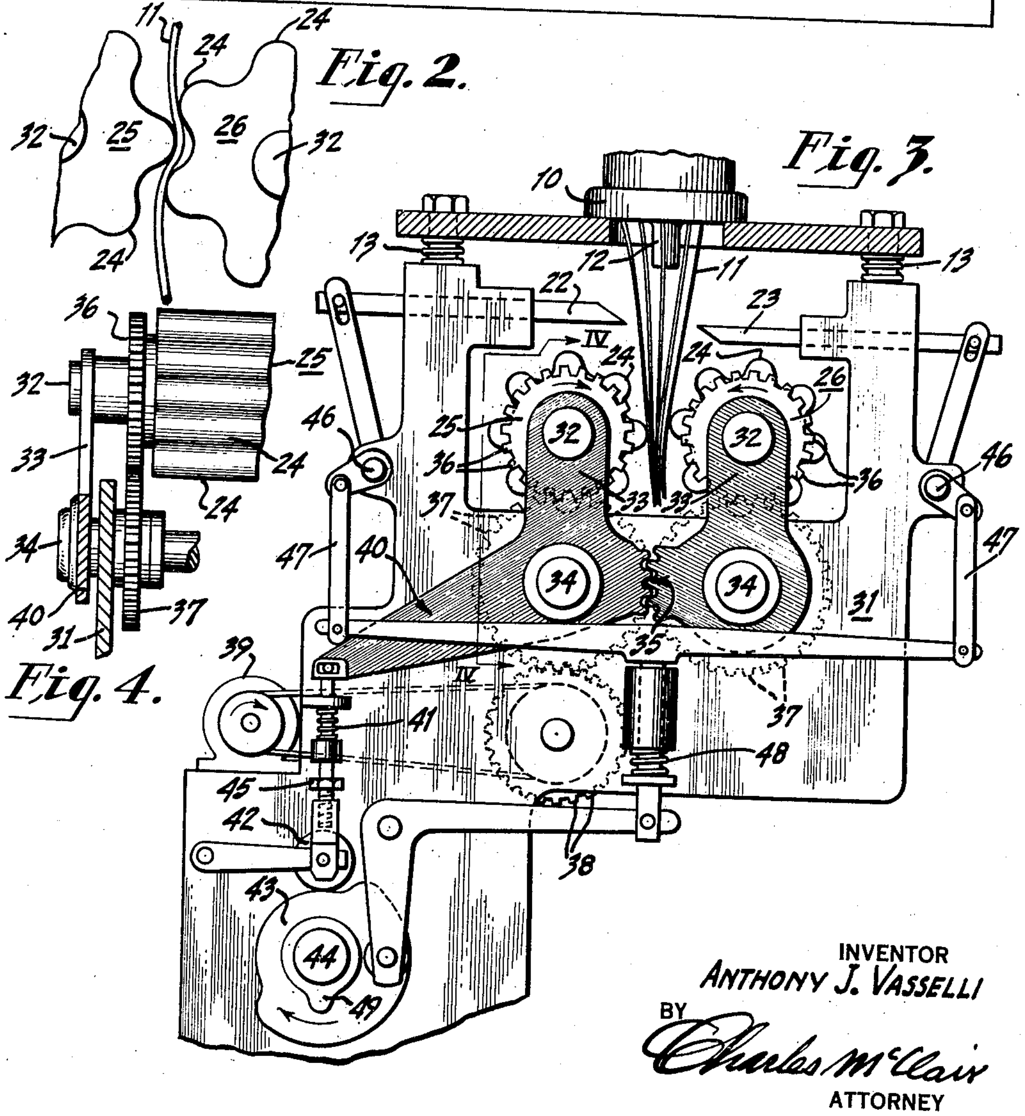

For purposes of illustration, one embodiment of my invention is described in the following specification and shown in the accompanying drawing in which Fig. 1 is a partly schematic view, partly in section, of a wire straightening device embodying my invention and useful in conjunction with the improved base threading machine shown in my above-identified application of which this application is a continuation-in-part;

Fig. 2 is a fragmentary view of the meshed surfaces of the rolls indicated in Fig. 1; Fig. 3 is a side view of one form of apparatus for straightening and trimming the outer lead wires; and Fig. 4 is a view with some parts in section along the line IV—IV of Fig. 3.

The particular tube 10 chosen for illustrating the operation of my lead wire straightening machine is a tipless metal tube of the general type shown in U. S. Patent 2,263,396 to D. W. Power. Only the lower end of the tube is shown, with the outer leads 11 as they appear before the tube is based. The completed tube has a base which comprises an insulating wafer or disc carrying a number of parallel hollow contact pins preferably arranged in a circle. The outer leads or wires 11 of the tube are extensions of leading-in wires sealed into a glass header in one end of the tube envelope. The exhaust tube 12 extends outwardly from the center of the header, and the points at which the leading-in wires are sealed into the header preferably lie in a circle which in the particular tube illustrated is concentric with and slightly smaller in diameter than the contact pin circle of the base. In threading a base by hand an operator can remove bends and kinks from the outer leads and cut them to length. The conventional outer leads for many types of tubes are long slender wires of soft copper, from .015 to .030 inch in diameter, and are quite flexible, and their outer ends have to be guided by hand into the contact pins. If the lead wires are straight and are slightly springy, the ends of the straightened lead wires may be found and guided into the small openings in the contact pins by the lead wire threading machine disclosed in my application, Serial No. 448,742, now Patent No. 2,390,139.

According to my invention, the outer lead wires are straightened and made slightly springy and also separated so as to lie side by side by exerting on them a pull lengthwise of the wires which is sufficient to stretch them to a slight extent and thus remove bends and kinks from the individual lead-in wires and also make them slightly springy and at the same time arrange the straightened wires side by side so that the straightened lead wires form a bunch of wires projecting side by side from the header and free from snarls or overlapping wires. To this end, the wires near their free ends are slidably gripped between two toothed or corrugated drums of a wire puller, which in general resembles a wringer with corrugated rolls, and which slidably grips the wires. The friction between the wires and the rotating corrugated drums, due to the relation between the teeth of the rolls and the lead wire, best shown in Fig. 2, causes the rotating drums to take a slipping grip on the wires and exert on them a pull which is continuous as long as the rolls rotate, and which, while great enough to stretch the wires slightly and straighten them, is not great enough to pull them out of the header. While the wires are held taut they are in a convenient position to be cut automatically by a cut-off mechanism or shear which preferably cuts them to length at a point between the header and the puller, the portions gripped by the drums being discarded.

As shown in Fig. 1, the leads are passed through an opening 20 in a spring supported face plate 21 to extend between a pair of cutting blades 22 and 23 with the free ends of the lead wires between the two drums 25 and 26 of the puller. The rounded teeth 24 extend lengthwise of the drums or rolls, which are in effect corrugated, and are geared to each other so that the rounded ridges or teeth on one roll are opposite but not in contact with the grooves in the other roll. The teeth are therefore loosely meshed and widely spaced, and the circles of rotation of the teeth overlap only enough to slidably grip the wires between the rounded points of the teeth with a slipping grip sufficient to exert the desired pull. As the teeth pull on the wires the tube envelope 10 is drawn against the face plate 21 with considerable force and moves the plate against the thrust of the springs 13 under the face plate until the face plate encounters the stop 27. The face plate thus acts as a holder for the tube or similar device while the lead wires are being straightened. The drums are geared together at their ends so that the teeth of the two drums run in meshed but spaced relation and their proximate surfaces move away from said holder plate 21. One of the drums is preferably eccentrically or otherwise journalled so that it may be moved toward or away from the other drum to adjust and very the spacing of the drums and thus control the grip of the teeth 24 on the wires between them. The spacing between the loosely meshed teeth of the two drums is easily adjusted with relation to the thickness and stiffness of the wires, so that the wires will be pulled straight without breaking, and without being pulled out of the header. The drums may be driven at suitable speed for the operation, such as 300 to 400 revolutions per minute, and the wires inserted through the face plate are caught by the rounded teeth of the drums and straightened almost instantaneously. The cut-off shears for the wires may be manually operated or may be automatically actuated as by the magnet 28 with a winding energized from a source 29 connected to the winding by a switch 30, which is closed by the face plate as it moves against the thrust of the springs 13. The operator picks up an envelope with, say her left hand, bunches the wires so they will pass through the face plate hole 20 into the teeth of the drums which grip the wires near the ends and pulls them with such force that the wires are straightened, and then cut off while held taut by the drums.

Fig. 2 is a fragmentary view showing the loose mesh relation of the toothed rolls 25 and 26. Each tooth on one roll enters a cooperating groove on the other roll far enough to make a slight bend in the wire between the rolls and have a slipping grip on the wire to produce the desired amount of friction and pull on the wire. The deeper the tooth goes into the groove, the greater is the bend in the wire and the sliding or slipping grip of the teeth on the wire, and the greater the pull on the wire. By adjusting the spacing between the rolls, the pull on the wire can be controlled very accurately. The teeth on one roll should not touch the teeth on the other roll, as the wire will be cut instead of being pulled by friction if the teeth come in contact with the wire between them. The teeth 24 should be of such size and shape that the wire will be bent slightly, as shown in Fig. 2, but not pushed to the bottom of the groove, and not gripped with a positive grip. Experience has shown that the kind and amount of pull necessary to straighten the wires without pulling them out of the header cannot be obtained by gripping the ends of the wires between rolls having a smooth or knurled surface. Such rolls either do not exert enough of a slipping grip on the wires to pull and straighten them, or else grip the wires so firmly that the wires are pulled out of the header.

Good results have been obtained in straightening the conventional outer leads, usually of soft copper wire from .015 to .025 in diameter, by corrugated rolls about an inch in diameter, each having eight teeth evenly distributed and grooves between the teeth about one-eighth inch in depth. The ends of the teeth should be rounded so as not to cut the wires. The size of the rolls and the size and number of the teeth may be varied in accordance with the diameter and stiffness of the wire in order to achieve the desired slidable or slipping grip which produces the proper pull on the wire.

The wire straightening and cutting mechanism shown schematically in Fig. 1 may be made automatic, as shown in Figs. 3 and 4, so that the wire puller opens to receive the outer leads or wires of a tube in position on the face plate 21, then closes to grip and pull on the wires to straighten them and hold them taut while the shears cut the straightened wires, and then opens and discharges the cut-off ends of the wires. In Figs. 3 and 4 the same reference characters are used to designate the cutter blades and the puller drums as in Fig. 1.

The wire puller is shown in the open position in Fig. 3 with the cutter blades 22 and 23 and the drums 25 and 26 separated so that when a tube is placed on the face plate 21, the leads 11 extend between the cutter blades and into the space between the drums so that the wires may be gripped near the ends by the puller. The various parts of the mechanism are mounted on a frame 31. The drums 25 and 26 are rotatably mounted and are also bodily movable toward and away from each other to close and open the puller. In the particular construction shown, the drums 25 and 26 are rotatably mounted on spindles or axles 32 in the ends of movable members, such as rocker arms 33 pivoted on shafts 34. The rocker arms are connected, for example by gear teeth 35, to swing the drums toward and away from each other as the rocker arms swing on their pivots 34 which are eccentric to the spindles 32 of the drums. Each drum has on the end a gear 36 in mesh with two intermediate gears 37 rotatably mounted on the shafts 34 and in mesh with each other. The gears 37 are driven by a gear 38 which in turn is driven, preferably through a belt or chain drive, by a motor 39. In this way the drums may be continuously rotated at a speed which is most suitable for operation of the device.

In order to move the drums bodily toward and away from each other, the rocker arms are rocked on their shafts. Preferably one of the rocker arms is shaped like a bell crank, with a spindle for one of the rolls near the end of one arm, and is rocked on its pivot by the other arm 40 connected to the upper end of an actuating rod 41 having at its lower end a cam follower such as the roller 42 which is in contact with and actuated by a timing cam 43 rotatable in the direction of the arrow and fixed on a rotatable timing cam shaft 44. Each revolution of the timing cam shaft moves both rocker arms to bring the drums toward each other and hold them in the closed position for part of a revolution of the timing cam, and then moves them away from each other to open the puller during the remainder of the revolution of the timing cam. The speed of the timing cam shaft 44 is independent of the speed of rotation of the drums 25 and 26 and can be chosen to suit the rate at which the tubes are placed in position on the face plate 21.

The spacing between the drums when in closed position can be adjusted by varying the length of the actuating rod 41 in some convenient way, for example, by means of an adjusting screw 45, with right and left-hand threads on opposite ends, which are threaded into the two end portions of the actuating rod. The adjusting screw forms part of the actuating rod 41 which can be shortened or lengthened as desired by turning the screw.

The wires 11 are cut to length after they have been stretched and straightened and while they are still held taut by the rotating drums 25 and 26. The cutter blades 22 and 23 are actuated by rock shafts 46 mounted on the frame 31 and rocked to and fro through linkage work 47 pivotally connected to a vertically movable push rod 48 slidably mounted on the frame and actuated by a cutter control cam 49 mounted on the timing cam shaft 44 in such relation to the timing cam 43 that the cutter blades are moved into the cutting position shown in dotted lines and the wires are cut while the drums 25 and 26 are still held in the closed position, so that they are still gripping the wires 11 and holding them taut.

In the operation of the apparatus the tube 10 is placed on the face plate 21 which is mounted immediately above the mechanism shown in Fig. 2 so that the wires 11 will project between the cutter blades 22 and 23 with their ends between the rotating drums 25 and 26 as shown schematically in Fig. 1. As the timing cam shaft 44 rotates, the rocker arms are rocked about their pivots toward each other and bring the drums 25 and 26 close enough together so that the teeth 24 slidably grip the wires 11 with a slipping grip and by friction on the stationary wires exert a pull on the wires sufficient to stretch them slightly and to straighten them. In response to this pull on the wires the face plate 21 is pulled down against the thrust of the springs 13. After the wires are straightened and while they are still taut and under tension due to the continuing pull of the rotating drums, the cutter blades 22 and 23 are actuated by the cutter control cam 49 which closes the cutter blades in proper sequence to the pulling and straightening of the wires by the drums 25 and 26. Further rotation of the timing cam shaft separates the cutter blades and moves the drums 25 and 26 away from each other, thereby opening the puller, whereupon the cut-off ends of the wires are discharged from the machine.

Good results have been obtained in threading the lead wires into the base pins of so-called all-metal radio tubes of which the types commercially known as the 6K7 or the 6J7 are common. These tubes have an envelope about one inch in diameter and have eight copper outer leads about .015 inch in diameter and two inches long extending from the header of the tube. An operator can consistently straighten the outer leads and thread the bases of 450 to 500 tubes per hour with my base threading machine equipped with my wire straightener, whereas the same operator can by hand straighten the leads and thread the base of no more than 300 tubes per hour. My improved wire straightener for base threading machines is inexpensive, strong, and easy to operate.

I claim:

1. A machine for straightening the outer leads of radio tubes and similar devices to facilitate base threading comprising a holder for supporting a tube with outer leads projecting from its end, a pair of parallel corrugated rolls positioned adjacent said holder to receive between them the ends of the leads of a tube in said holder, said rolls having gears geared to each other to maintain the ridges and grooves of said rolls in mesh relation and spaced to slidably grip the leads between them, and driving means to rotate said rolls to move their proximate surfaces away from said holder.

2. A machine for straightening the outer leads of radio tubes and similar devices to facilitate base threading comprising a holder for supporting a tube with outer leads projecting from its end, a pair of parallel rotatable toothed rolls having radially projecting rounded teeth extending lengthwise of the rolls, said rolls having gears geared to each other and being mounted adjacent said holder with their rounded teeth loosely in mesh and spaced to slidably grip the outer ends of the leads between them to exert on said leads sufficient tension to slightly stretch and thus straighten said leads as said rolls rotate, and means for rotating said rolls to move the teeth in engagement with said leads away from said holder.

3. A machine for straightening the outer leads of radio tubes and similar devices to facilitate base threading comprising a holder for supporting a tube with outer leads projecting from its end, a pair of parallel corrugated rolls mounted adjacent said holder in position to grip between them the free ends of the outer leads of a tube in said holder, supports for said rolls, means for oscillating said supports to vary the spacing between said rolls, and means for rotating said rolls to move their proximate surfaces away from said holder and exert on said leads and in a direction away from said holder a sufficient pull to straighten said leads and place the straightened portions near the ends side by side and in alignment.

4. A machine for straightening the outer leads of radio tubes and similar devices which comprises a pair of parallel corrugated rolls in mesh relation and spaced to slidably grip lead wires between said rolls with sufficient force to exert tension on the lead wires by rotation of said rolls, a tube holder adjacent to and adapted for restricted movement toward said rolls and adapted to hold a tube having outer leads projecting from its end in position opposite the meshed teeth of said rolls and with the free ends of the leads between said teeth, resilient restraining means for restraining said holder against movement toward said rolls, and driving means for rotating said rolls to move their meshed teeth away from said holder and thereby exert on the leads sufficient tension to move said holder against the thrust of said restraining means.

5. A machine for straightening the outer leads of radio tubes and similar devices to facilitate base threading comprising a holder for supporting a tube with outer leads projecting from its end, a pair of corrugated rolls in mesh relation and spaced to engage the lead wires at points near their free ends to slidably grip said ends, driving means for rotating said rolls to exert on said leads sufficient tension to straighten them and to hold them taut, a cutter mounted to engage said leads between said rolls and said holder, and control means for actuating said cutter to cut said wires while held taut by said corrugated rolls.

6. A machine for straightening the outer leads of radio tubes and similar devices to facilitate base threading comprising a holder for supporting a tube with outer leads projecting from its end, lead tensioning and straightening means positioned adjacent said holder and comprising a pair of loosely meshed corrugated rolls journalled on parallel axles and spaced to slidably grip the leads of a tube in said holder near their free ends, an axle carrying member movably mounted to move at least one of said rolls bodily toward and away from the other roll, and means for controlling the movement of said member to vary the spacing between said rolls.

7. A machine for straightening the outer leads of radio tubes and similar devices to facilitate base threading comprising a holder for supporting a tube with outer leads projecting from its end, lead tensioning and straightening means positioned adjacent said holder and comprising a pair of loosely meshed corrugated rolls journalled on parallel axles and spaced to slidably grip the leads of a tube in said holder near their free ends, an arm pivoted to swing toward and away from one of said rolls, the axle of the other roll being mounted on said arm at a point eccentric to the pivot of said arm, and means for moving said arm about its pivot to vary the spacing of said rolls.

8. A machine for straightening the outer leads of radio tubes and similar devices to facilitate base threading comprising a holder for supporting a tube with outer leads projecting from its end, two parallel rotatable cylindrical drums with teeth having rounded ends and extending lengthwise of said drums, gearing between said drums to maintain them with their teeth spaced and in mesh relation, and a tube support plate parallel to said drums and having opposite the meshed teeth of said drums an opening smaller than the end of the tube and through which leads projecting from the end of a tube resting on said plate extend between the meshed teeth of said drums.

9. A machine for straightening the outer leads of a radio tube and similar device with outer leads projecting from its end comprising two drums rotatable on parallel axes, each drum having rounded teeth extending parallel to its axis, gearing between said drums to rotate said drums with their teeth in mesh relation and spaced to slidably grip a lead between the meshed teeth, means for moving said drums bodily toward and away from each other, and a holder adjacent said drums to position the leads with one end between the meshed teeth of said drums and to hold the leads firmly at the other end against the pull exerted on the leads as said drums rotate.

10. A wire straightener for straightening a wire fixed in and projecting from a device of which the wire is a component part comprising two cylindrical drums rotatable on parallel axes and having rounded gear teeth extending lengthwise of the cylindrical drums, said drums being positioned to mesh each tooth on one drum in a larger round bottom groove on the other drum, means for spacing the end of each rounded tooth on one drum from the bottom of the groove on the other drum a distance greater than the diameter of the wire to be straightened, said means including rocking supports for said drums, a plate parallel to the two drums spaced from said drums a distance less than the length of the wire to be straightened and having an opening smaller than the device and larger than the wire opposite the meshed teeth of the drums, and positive driving connections between the drums to hold the teeth in meshed but spaced relation and to drive said drums to move their proximate surfaces in a direction away from said plate.

11. A wire straightener for straightening a wire fixed in and projecting from a device of which the wire is a component part comprising two toothed drums rotatable on parallel axes with the teeth in meshed but spaced relation with the spacing between the meshed teeth greater than the diameter of the wire to be straightened, means for adjusting the spacing between the two drums to correspond to the diameter of the wire, said means comprising supports for said drum and means for synchronously moving said supports successively to and away from each other, holding means spaced from the meshed teeth of the drums for holding the device with the free end of the projecting wire between the meshed teeth of the drums, and positive driving connections for driving said drums with the teeth in said meshed but spaced relation and in a direction to cause the proximate surface of said drums to move away from said holding means.

ANTHONY J. VASSELLI.

REFERENCES CITED

The following references are of record in the file of this patent:

UNITED STATES PATENTS

| Number | Name | Date |
|---|---|---|
| 508,074 | Woodward | Nov. 7, 1893 |
| 627,200 | Neracher | June 20, 1899 |
| 823,766 | Conklin | June 19, 1906 |
| 907,595 | Harris | Dec. 22, 1908 |
| 1,383,576 | Sorensen | July 5, 1921 |
| 1,568,254 | Taylor | Jan. 5, 1926 |
| 1,760,629 | Brindle | May 27, 1930 |
| 1,821,894 | Otaka | Sept. 1, 1931 |
| 1,917,624 | Webb | July 11, 1933 |
| 2,018,400 | Hack | Oct. 22, 1935 |
| 2,332,274 | Slayter | Oct. 19, 1943 |